United States Patent [19]

Thomson

[11] Patent Number: 4,731,830
[45] Date of Patent: Mar. 15, 1988

[54] NONSATURATING INTERFACE SUPPLY

[75] Inventor: Robert G. Thomson, Tempe, Ariz.

[73] Assignee: GTE Communication Systems Corporation, Phoenix, Ariz.

[21] Appl. No.: 784,085

[22] Filed: Oct. 4, 1985

[51] Int. Cl.$^4$ ............................................. H04M 19/00
[52] U.S. Cl. ..................................... 379/387; 379/395;
323/223; 323/224; 323/315
[58] Field of Search .............. 179/90 B, 81 R, 90 BD,
179/90 BB, 77, 84 T, 70, 170 J; 323/223, 224,
226, 315; 379/387, 395, 359, 400, 413, 322, 324

[56] References Cited

U.S. PATENT DOCUMENTS

| 4,197,425 | 4/1980 | Secrett et al. | 179/2 BC |
|---|---|---|---|
| 4,360,710 | 11/1982 | Chaput et al. | 179/81 R |
| 4,495,382 | 1/1985 | Smith et al. | 179/81 R |
| 4,555,597 | 11/1985 | Boeckmann et al. | 179/90 B |
| 4,639,551 | 1/1987 | Kaire | 379/387 |

FOREIGN PATENT DOCUMENTS 0055426  4/1982  Japan ..................................... 363/89

Primary Examiner—Jerry W. Myracle
Assistant Examiner—Lawrence Fess
Attorney, Agent, or Firm—John A. Odozynski; Peter Xiarhos

[57] ABSTRACT

An integrated circuit includes an interface circuit for coupling with a relative high-level VOICE circuit and a relatively low-level DIALER circuit to a subscriber line. A first shunt transistor is coupled across the telephone line and has its collector current forced by a current sink driven from the VOICE circuit. A second shunt transistor is coupled in a current mirror configuration to the first shunt transistor and supplies current to the DIALER circuitry. The interface circuit includes a saturation prevention circuit coupled to the current sink and to the second shunt transistor for sensing a tendency of the second shunt transistor toward saturation and for increasing the collector current load on that transistor in response. The saturation prevention circuit includes a voltage offset element and a sensing transistor arranged to form a loop with the collector-to-base junction of the second shunt transistor. As the collector-to-base junction of the shunt transistor approaches a forward-biased condition, the normally nonconducting sensing transistor is biased into conduction so that the collector load on the shunt transistor is increased.

14 Claims, 2 Drawing Figures

NONSATURATING INTERFACE SUPPLY

FIELD OF THE INVENTION

The invention relates to telecommunications interface circuitry and, more particularly, to a circuit for efficiently providing current to a pendant, relatively low-power "DIALER" circuit while adhering to telephone line interface impedance requirements.

BACKGROUND OF THE INVENTION

Prior to the subject invention, a specific intergrated circuit device used in customer premises telephone applications had been configured as shown in FIG. 1. The device as shown therein includes both a VOICE circuit coupled across the inpout terminals (TIP and RING leads) and a low-level "DIALER" circuit. The DIALER circuit might include, for example, UDK or PULSE DIAL functons and repertoire dialing. Because the DIALER circuit imposes only modest current demands, on the order of 0.85 ma, its power may be derived from a large-valued capacitor, CL, charged through a series-connected resistor R1 and Schottky diode, CR1. The VOICE circuit, on the other hand, is required not only to supply a specified output power level but also so sink current in an amount equal to at least 8 ma in order to prevent the central office from "dropping out". In order to accomplish this, the prior art implementation had utilized a PNP bypass transistor (not shown in FIG. 1) to carry 8 ma from the TIP to the RING terminals of the subscriber line.

A salient component of the subject invention is a recognition that some part of that 8 ma may be used to charge C1 and thereby supply the current necessary for operation of the DIALER circuit. Two concerns are brought to bear on the design of a circuit intended to accomplish this result. First, because the impedance across the input terminals must be maintained at a specified high level, it is important that the bypass transistor not be driven into saturation. Second, the current driven into storage capacitor C1 must not be allowed to result in a voltage greater than the DIALER circuit can tolerate. A particular DIALER circuit with which the invention was used required that the voltage across C1 not exceed approximately 6 volts.

DISCLOSURE OF THE INVENTION

The above objects, advantages and capabilities are achieved in one aspect of the invention by a nonsaturating interface supply circuit for an integrated circuit that is coupled across two terminals at the ends of signal-carrying lines. In one aspect of the invention, the interface supply constitutes part of a telephone terminal apparatus so that the supply is required not only to maintain at lease a minimum current flow between the two terminals but also to supply a specified current to a pendant, low-level circuit that might include, for example, DIALER circuitry, a telecommunications microcomputer, or a VOICE circuit for processing signals received from or transmitted to the central office.

The interface supply incorporates improved circuitry that operates to prevent a regulator transistor from being driven into saturation. To wit: A voltage offset element is coupled to the regulator transistor and a current sink is coupled to the offset element so as to establish a predetermined offset voltage across the element. A sensing transistor is coupled to the regulator transistor and to the voltage offset element so as to form a circuit loop consisting of the voltage offset element, the collector-base junction of the regulator transistor, and the base-emitter junction of the sensing transistor. The sensing transistor is normally nonconducting but is rendered conductive when the collector-base junction of the regulator transistor approaches a forward-biased condition. When conducting, the sensing transistor increases the current drawn from the regulator transistor so as to circumvent its saturation.

DESCRIPTION OF A PREFERRED EMBODIMENT

Figure 1:
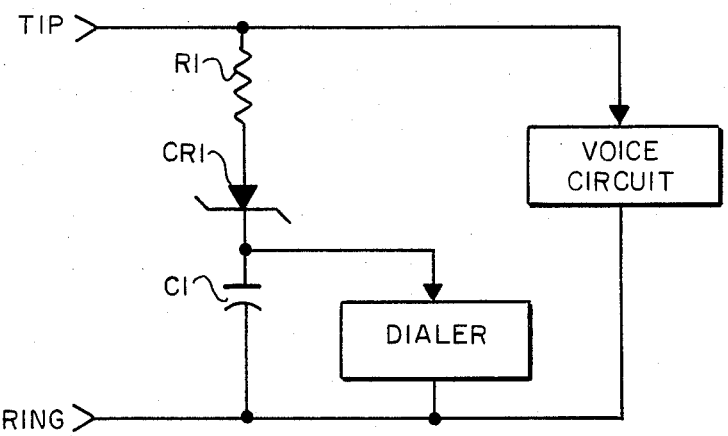
FIG. 1 is a block diagram of prior art configuration including, as does the subject invention, a telephone VOICE circuit and a DIALER circuit.
Figure 2:
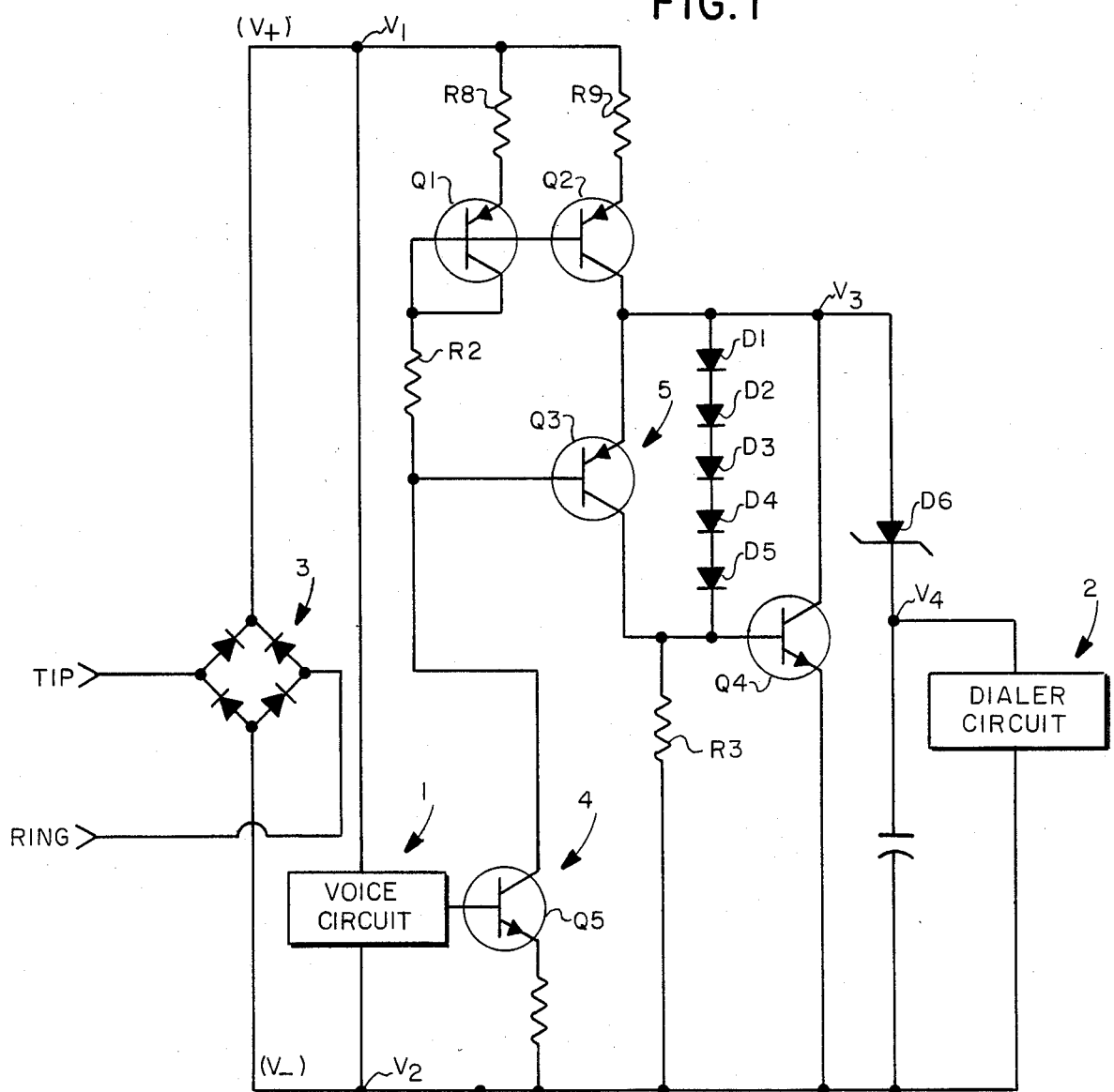
FIG. 2 is a schematic diagram of the subject Nonsaturating Interface Supply.

For a better understanding of the subject invention, reference is made to the following description and appended claims, in conjunction with the above-described drawings. Referring now to FIG. 2, the subject interface circuit as depicted therein is incorporated as part of a telecommunications integrated circuit device that includes a VOICE circuit 1 and a DIALER circuit 2. The interface circuit is coupled at terminals V1 and V2 through a diode bridge 3 to the TIP and RING leads of the subscriber line. The VOICE circuit is shown coupled across terminals V1 and V2. The DIALER circuit is coupled to the line through a shunt regulator that includes transistor Q2. As indicated above, the DIALER circuit is a relatively low-level circuit and may require up to approximately only 0.85 ma supply current in order to operate.

The telecommunication integrated circuit is also shown to include a first bypass PNP transistor Q1 coupled across terminals V1 and V2. Q1 has an emitter coupled to V1 through an emitter resistor R8 and a collector coupled through resistor R2 to a current sink 4 that includes a transistor Q5. The VOICE circuit provides telephone voice signal to the central office.

Q1 base has been connected to its collector so that the transistor operates in the mode of a diode. The current established by current sink 4 flows through R8, through the base-emitter junction of Q1, and through resistor R2. Current flow in this path is maintained at a level necessary to prevent the central office from dropping out during an off-hook condition.

Current to the DIALER circuit is supplied by a shunt regulator transistor Q2 which has its base coupled to the base of Q1 in a current mirror configuration. Q2 emitter is coupled through resistor R9 to V1. The value of Q1 emitter resistor R8 is designed to be three times the value of Q2 emitter resistor R9 and the emitter areas of the two transistors are proportioned in an inverse manner (emitter area of Q2 is three times the emitter area of Q1) so that the current flowing through Q2 is substantially equal to three times the current flowing through bypass transistor Q1. Q2 collector is coupled through Schottky diode D6 to the DIALER circuit and a parallel-connected storage capacitor C1. The charge stored in and resulting voltage developed across C1 powers the DIALER circuit in a well-understood fashion.

One of the pitfalls to be avoided in supplying current to the DIALER circuit through Q2 is the possibility that excessive base drive to Q2 or that lessening of the load at Q2 collector, as when C1 becomes fully charged and the current drawn by the DIALER circuit diminishes, might cause Q2 to become saturated. When Q2 becomes saturated, its base-to-collector junction becomes forward biased and the impedance across V1 and V2 drops below an acceptable level.

In order to preclude such an event, a saturation prevention circuit 5 is included to sense the tendency of Q2 toward saturation and, in response to such tendency, increase the current load at the collector of Q2. The saturation prevention circuit includes a voltage offset element in the form of resistor R2 and a current sensing transistor coupled between the collector of Q2 and the junction of R2 and current sink Q4. The voltage offset element, R2, is coupled between the base of Q1 and the base of sensing transistor Q3. Q3 emitter is coupled to Q2 collector and its collector is coupled through a resistor R3 to V2.

In general, operation of the impedance maintenance circuit proceeds as follows. R2 and current sink Q4 are designed so that the voltage offset between the base of Q2 and the base of Q3 is approximately one half the normal base-to-emitter forward voltage drop, Vbe. During normal operation Q2 collector-base junction will be significantly back-biased and both Q3 and Q4 will be nonconducting. However, should Q2 tend toward saturation, for whatever cause, the voltage at the collector of Q2 will become less negative with respect to the voltage at its base. As the voltage at the collector of Q2 tends to become positive with respect to the voltage at its base (the definition of saturation), Q3 base-emitter junction becomes forward-biased, thereby driving Q3 into conduction. The increased load on Q2 presented by Q3 current will prevent Q2 from falling into saturation.

In order to appreciate the manner in which this occurs, note that the collector-base junction of Q2, R2 of the voltage offset element, and the base-emitter junction of Q3 form a closed loop, so that their respective voltages must obey the relationship $V_{cb}(Q2) + V(R2) + V_{be}(Q3) = 0$. Given that $V(R2) = -0.5\ V_{be}$, it can be seen that as $V_{cb}(Q2)$ approaches zero volts, the emitter of Q3 becomes positive with respect to its base. Any further tendency of Q2 toward saturation places an additional forward bias across Q3 emitter-base junction. This will result in increased base drive to current sink Q4, which, in turn, holds Q2 out of saturation.

In addition to the necessity to prevent the saturation of Q2, it is also necessary to limit the maximum voltage applied across the DIALER circuit. The voltage safely tolerated by such circuits can be expected to vary, but a range extending from 2.5 to 6.0 volts may be anticipated. In order to achieve this result a diode string, consisting of D1, D2, D3, D4, and D5, is connected between the collector and the base of Q4. If the voltage at the anode of D6 attempts to exceed 6 Vbe, D1 through D5 and Q4 begin to conduct, thereby limiting the charge supplied to C1 and the voltage applied to the DIALER circuit.

Accordingly, although there has been disclosed and described what at present is considered to be the preferred embodiment of the subject invention, it will be obvious to those having ordinary skill in the art that various changes and modifications may be made therein without departure from the scope of the appended claims. For example, although the invention is described with respect to an integrated circuit implementation of telecommunications equipment, it clearly retains applicability with other types of equipment or with discrete implementations.

What is claimed is:

1. A nonsaturating interface circuit for coupling both a relatively high-level voice circuitry and a relatively low-level dialer circuitry across the TIP and RING leads of a telephone line, the interface circuit comprising:
    means for coupling the voice circuitry across the TIP and RING leads,
    a first shunt transistor coupled at a first electrode through a resistor to the telephone line;
    a current sink coupling a second electrode of the first transistor to the telephone line;
    a second shunt transistor coupled to the first shunt transistor, said second shunt transistor for supplying current to the relatively low-level circuitry; and
    a saturation prevention circuit coupled between the base and collector of the second shunt transistor for sensing the tendency of said second shunt transistor toward saturation and for increasing the current load on the second shunt transistor so as to prevent saturation and therefore maintain the impedance between the TIP and RING leads.

2. A nonsaturating interface circuit as defined in claim 1 wherein the saturation prevention circuit includes a voltage offset element and a sensing transistor and wherein the saturation prevention circuit is so arranged that the voltage offset element, the collector-to-base junction of the second shunt transistor, and the emitter-to-base junction of the sensing transistor form a closed loop.

3. A nonsaturating interface circuit as defined in claim 2 wherein the voltage offset element is coupled to the current sink so that the voltage across the voltage offset element is substantially determined by the current flowing through the current sink.

4. An interface circuit as defined in claim 3 wherein the current sink is coupled to the voice circuitry.

5. A nonsaturating interface circuit as defined in claim 2 wherein the saturation prevention circuit defines a circuit loop including the collector-to-base junction of the second shunt transistor, the voltage offset element, and the base-to-emitter junction of the sensing transistor, so that the sensing transistor begins to conduct when the voltage across the collector-to-base junction of the second shunt transistor approaches a predetermined value established by the voltage offset element.

6. A nonsaturating interface circuit as defined in claim 5 wherein the voltage offset element includes a resistor having one end coupled to the first shunt transistor and a second end coupled to the current sink so that the current sink establishes the magnitude of a voltage offset effected by the voltage offset element.

7. A nonsaturating interface circuit as defined in claim 6 further comprising means for maintaining the voltage applied to the dialer circuitry below a predetermined level.

8. A nonsaturating interface circuit as defined in claim 7 wherein said means includes a clamping transistor coupled at one end to both the second shunt transistor and the dialer circuitry and at a second end to the telephone line and includes a diode string coupled between the dialer circuitry and the clamping transistor.

9. A nonsaturating interface circuit coupled to a source of power and for supplying current to a pendant circuit, the interface circuit comprising:
- a first shunt transistor coupled across the source of power;
- a current sink coupled to the first shunt transistor for establishing a predetermined current flow through the first shunt transistor;
- a second shunt transistor coupled in a current mirror configuration to the first shunt transistor for supplying operating current to the pendant circuit;
- a current sensing transistor coupled to the second shunt transistor; and
- a voltage offset element coupled to the second shunt transistor, to the current sensing transistor, and to the current sink whereby the voltage offset element,
- the collector-to-base junction of the second shunt transistor, and the base-to-emitter junction of the sensing transistor form a closed loop.

10. A nonsaturating interface as defined in claim 9 wherein the current sink operates to establish a predetermined offset voltage across the voltage offset element so that, as the collector-to-base junction of the second shunt transistor approaches a forward-biased condition the sensing transistor is rendered conductive, thereby increasing the current load imposed on the second shunt transistor.

11. A nonsaturating interface circuit as defined in claim 10 further comprising means for maintaining the voltage applied to the dialer circuitry below a predetermined level.

12. A nonsaturating interface circuit as defined in claim 11 wherein said means includes a clamping transistor coupled at one end to both the second shunt transistor and the dialer circuitry and at a second end to the telephone line and includes a diode string coupled between the dialer circuitry and the clamping transistor.

13. In an interface circuit for coupling a pendant circuit to a source of power and for supplying current through a regulator transistor to the pendant circuit, the improvement comprising means for maintaining the impedance presented to the source of power by preventing saturation of the regulator transistor, said means comprising:
- a voltage offset element coupled to the regulator transistor;
- a current sink coupled to the voltage offset element for establishing a predetermined offset voltage across the element;
- a sensing transistor coupled to the regulator transistor and to the voltage offset element so as to form a loop consisting of the voltage offset element, the collector-to-base junction of the regulator transistor, and the base-to-emitter junction of the sensing transistor, whereby the sensing transistor is normally nonconducting but is rendered conductive when the collector-to-base junction of the regulator transistor approaches a forward-biased condition.

14. An interface circuit as defined in claim 13 wherein the voltage offset element comprises a resistance so that the offset voltage is established according to the current that flows through resistance and wherein said current is derived from the current sink.

* * * * *